US011333111B2

(12) United States Patent
Koeger et al.

(10) Patent No.: US 11,333,111 B2
(45) Date of Patent: May 17, 2022

(54) AIR FILTER INCLUDING A SCAVENGING SHUTTER

(71) Applicant: BETH-EL ZIKHRON YAAQOV INDUSTRIES LTD., Zikhron Yaaqov (IL)

(72) Inventors: Samuel Koeger, Zikhron Yaaqov (IL); Jonathan Schneider, Zikhron Yaaqov (IL)

(73) Assignee: BETH-EL ZIKHRON YAAQOV INDUSTRIES LTD., Zikhron Yaaqov (IL)

( * ) Notice: Subject to any disclaimer, the term of this patent is extended or adjusted under 35 U.S.C. 154(b) by 203 days.

(21) Appl. No.: 16/959,284

(22) PCT Filed: Feb. 24, 2019

(86) PCT No.: PCT/IL2019/050209
§ 371 (c)(1),
(2) Date: Jun. 30, 2020

(87) PCT Pub. No.: WO2019/171370
PCT Pub. Date: Sep. 12, 2019

(65) Prior Publication Data
US 2021/0017939 A1   Jan. 21, 2021

(30) Foreign Application Priority Data
Mar. 8, 2018  (IL) .......................................... 257991

(51) Int. Cl.
*F02M 35/08*     (2006.01)
*B01D 46/71*     (2022.01)
(Continued)

(52) U.S. Cl.
CPC ........... *F02M 35/086* (2013.01); *B01D 46/71* (2022.01); *B01D 46/0005* (2013.01); *B01D 46/48* (2013.01); *B01D 2279/60* (2013.01)

(58) Field of Classification Search
CPC ............. F02M 35/086; F02M 35/0216; F02M 35/084; F02M 35/08; B01D 46/71;
(Continued)

(56) References Cited

U.S. PATENT DOCUMENTS 2,661,810 A * 12/1953 Heth ...................... F02M 35/08
                                                    55/301
3,871,845 A *  3/1975 Clarke ................... B01D 46/90
                                                    55/284

(Continued)

FOREIGN PATENT DOCUMENTS

EP        2 061 576 B1   10/2014
KR     1020080086633 A    9/2008
(Continued)

OTHER PUBLICATIONS

May 21, 2019 Search Report issued in International Patent Application No. PCT/IL2019/050209.
(Continued)

*Primary Examiner* — Hung Q Nguyen
(74) *Attorney, Agent, or Firm* — Oliff PLC

(57) ABSTRACT

An air filter for heavy dust conditions has an efficient scavenging system. The air filter includes: a housing, a permeable filter, and a scavenger system. The scavenger system disposes of particles collected on the upstream surface of the permeable filter. The scavenger system includes: an air suction source, and a shutter. The shutter is positioned substantially along, typically below, the permeable filter, at a certain distance from a wall, typically the bottom wall, of the housing. The air suction source draws air
(Continued)

from a collecting space located between the shutter and the wall of the housing. The shutter is being selectively operated to permit or restrict passage there-through. The air suction source efficiently operates to scavenge particles from the collecting space when the passage through the shutter is at least partially restricted.

18 Claims, 9 Drawing Sheets

(51) Int. Cl.
    *B01D 46/00* (2022.01)
    *B01D 46/48* (2006.01)
(58) Field of Classification Search
    CPC ............... B01D 46/0005; B01D 46/48; B01D 2279/60; B01D 45/16; B01D 46/02; B04C 3/00
    See application file for complete search history.

(56) References Cited

U.S. PATENT DOCUMENTS

| | | | |
|---|---|---|---|
| 3,884,658 A * | 5/1975 | Roach | F02M 35/08 55/482 |
| 4,158,449 A | 6/1979 | Sun et al. | |
| 4,259,095 A | 3/1981 | Johnson, Jr. | |
| 4,261,710 A * | 4/1981 | Sullivan | B01D 46/521 55/497 |
| 4,345,922 A * | 8/1982 | Grassel | B01D 46/4281 55/432 |
| 4,482,365 A | 11/1984 | Roach | |
| 5,401,285 A | 3/1995 | Gillingham et al. | |
| 5,972,215 A * | 10/1999 | Kammel | B04C 7/00 209/718 |
| 8,951,321 B2 | 2/2015 | Gillingham et al. | |
| 9,309,841 B2 * | 4/2016 | Troxell | B01D 46/446 |
| 2015/0345439 A1 | 12/2015 | Gomez et al. | |

FOREIGN PATENT DOCUMENTS

| | | |
|---|---|---|
| KR | 1020150135830 A | 12/2015 |
| KR | 101770466 B1 | 8/2017 |
| SU | 1367842 A3 | 1/1988 |
| WO | 2016/208888 A1 | 12/2016 |
| WO | 2017/196367 A1 | 11/2017 |
| WO | 2019/150356 A1 | 8/2019 |

OTHER PUBLICATIONS

May 21, 2019 Written Opinion of the International Searching Authority issued in International Patent Application No. PCT/IL2019/050209.

\* cited by examiner

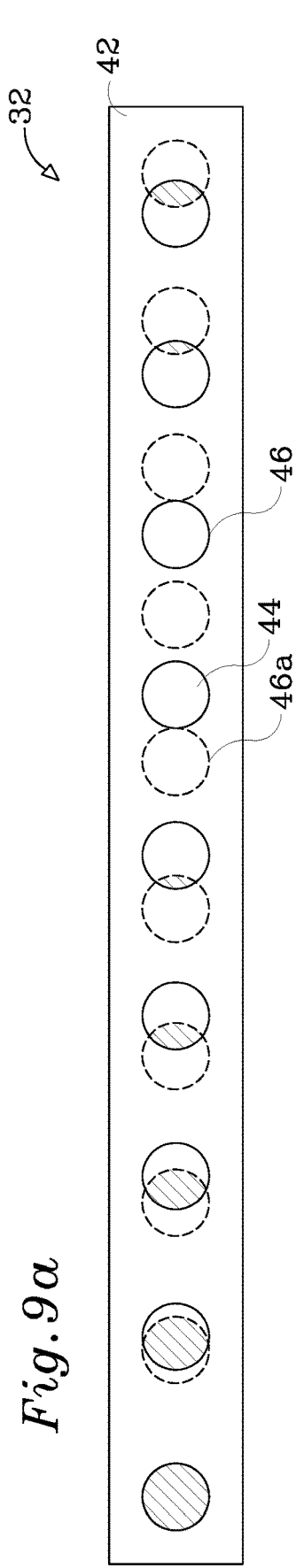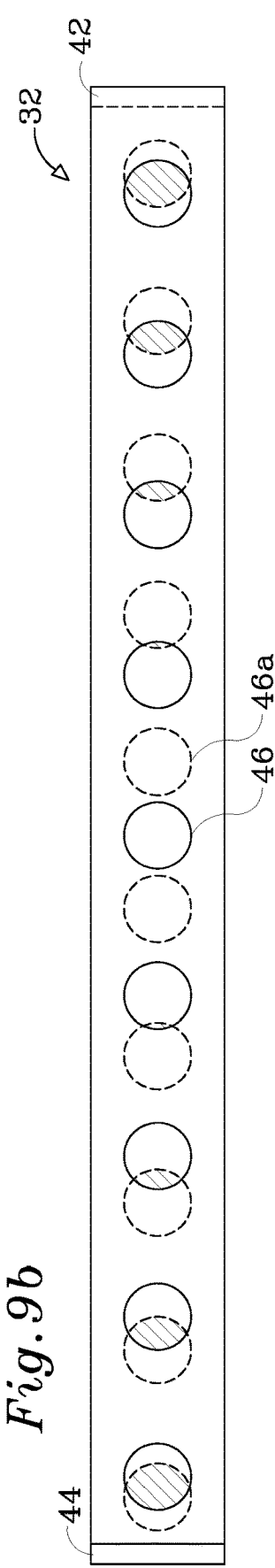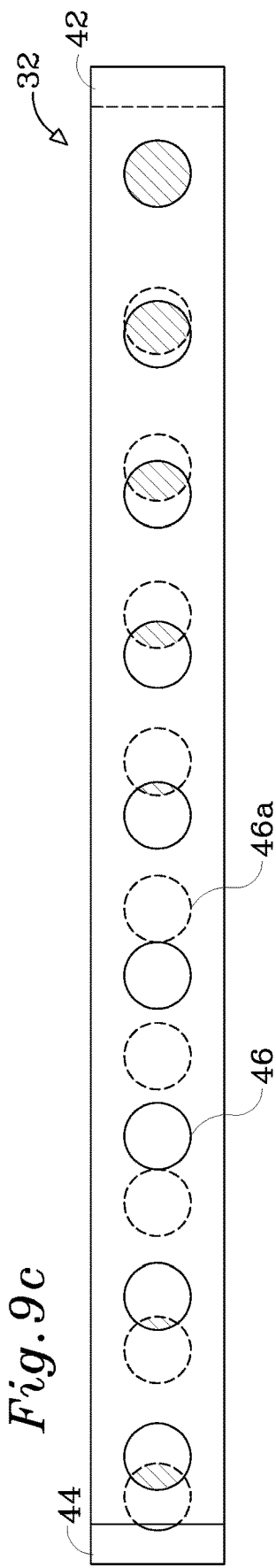

AIR FILTER INCLUDING A SCAVENGING SHUTTER

FIELD OF THE INVENTION

The present invention relates to an engine air filter for heavy dust conditions, including a scavenging shutter, and a method of operation thereof, more particularly to an air filter for heavy military and off-road vehicles including a controllable scavenging shutter that improves scavenging efficiency.

BACKGROUND OF THE INVENTION

It is known in the art of air filters for heavy dust conditions, in particular vehicular air filters of military and heavy off-road vehicles, to use a vortex type precleaner in conjunction with a permeable filter. The permeable filter is typically equipped with a pulse jet back-flow flush system. Such filter assemblies are equipped with a scavenger arrangement for disposing of large or heavy particles collected at both the precleaner and the permeable filter.

U.S. Pat. No. 5,401,285 filed on September 1993, discloses an air cleaner assembly including a vortex type precleaner, a permeable filter and a scavenger arrangement powered by an external blower. The ambient air directed into the precleaner is subjected to some particulate material removal. The air from the precleaner is then directed into the permeable filter, for further removal of particulate material. The scavenger arrangement is adapted to scavenge separated particulate material from both the precleaner and the permeable filter. An intermittently operated pulse jet back-flow flush system is provided to knock particulate material trapped on the upstream face of the permeable filter. The knocked particulate material is collected and disposed off through the suction side of the scavenger blower.

U.S. Pat. No. 5,401,285 mentioned above, highlights the difficulty of effectively scavenging both the precleaner and the permeable filter while keeping a preferable small size of the scavenging blower. According to the invention, efficient scavenging draw from the bottom of the permeable filter is facilitated by the size, shape and porosity of the scavenging ducts positioned therein. The proposed scavenging ducts are constructed as a conduit extending downwardly into the housing and then across the housing floor. Each scavenge duct includes a plurality of apertures or holes therein. The holes are positioned in the portion of the conduit that extends across the floor. In general, as air is drawn into the holes, particulate material in the housing will also be drawn into the scavenge duct. Thus, through appropriate attachment of a blower to the exit of the conduit, continuous (or at least selected) vacuuming or sweeping of the filter housing is provided, to facilitate extended operation without plugging of the filters. The particular configuration of conduits, and orientation of holes therein, facilitates operation.

U.S. Pat. No. 8,951,321 filed on September 2007, introduces some modifications to the scavenger arrangement of the above mentioned U.S. Pat. No. 5,401,285. The modifications suggests a very specific pattern of openings in the scavenge ducts that performs a better suction of the collected particulate material from the bottom of the permeable filter. The suggested pattern is specific to a permeable filter of the V-pack type where the particulate material is dropped from the permeable filter concentrated in a relatively small area. Different types of permeable filters such as cylindrical filters require larger scavenging area and may restrict successful scavenging of the permeable filter using the solution described above.

Israeli patent application 257321 to the present applicant discloses an air filter comprising: a housing, a precleaner, a permeable filter, and a scavenger system. The scavenger system disposes of particles collected at the precleaner and on the upstream surface of the permeable filter. The scavenger system comprises: an air suction source and a three way valve. The three way valve is airflow coupled to the precleaner, to the permeable filter and to the air suction source. The three way valve enables scavenging of the precleaner and the permeable filter alternately, thus saving space and energy that would have bean required by a larger scavenger blower capable of scavenging both the precleaner and the permeable filter simultaneously.

Yet even with the solution suggested in Israeli patent application 257321, the particles disposed from the permeable filter are first dropped to the bottom surface of the filter housing, those particles have to be raised by the scavenging system against gravity in order to reach the scavenger outlet port. Additionally, the area that needs scavenging under the permeable filter is typically larger that the scavenging area of the precleaner. Both the scavenging against gravity and the larger scavenging area, requires a larger airflow for scavenging the permeable filter than the airflow required for scavenging of the precleaner.

Accordingly there is a need to further optimize or otherwise revise the above prior art systems in order to provide an efficient scavenging of the permeable filter without increasing the size of the scavenger blower.

SUMMARY OF THE INVENTION

Accordingly, it is a principal object of the present invention to overcome the disadvantages and limitations of prior art systems and provide an air filter for heavy dust conditions, with an efficient scavenging system.

According to one aspect of the present invention, there is provided an air filter comprising: a housing, a permeable filter, and a scavenger system. The scavenger system disposes of particles collected on the upstream surface of the permeable filter. The scavenger system comprising: an air suction source, and a shutter. The shutter is positioned substantially along, typically below, the permeable filter, at a certain distance from a wall, typically the bottom wall, optionally an internal partition of the housing. The air suction source draws air from a collecting space located between the shutter and the wall of the housing. According to the invention, the shutter is being selectively operated to permit or restrict passage there-through. The air suction source efficiently operates to scavenge particles from the collecting space when the passage through the shutter is at least partially restricted.

According to another aspect of the invention, the shutter comprises a first perforated sheet and a second perforated sheet, slide-ably seated against each other. The perforations of the perforated sheets are so arranged that at a first positional relation between the first and second perforated sheets, the perforations of the first sheet are substantially positioned against an unperforated area of the second sheet, thus at least partially restricting passage through the shutter. At a second positional relation between the first and second perforated sheets at least a region of the perforations of the first sheet are aligned with at least a region of the perforations of the second sheet, thus permitting controllable passage through the shutter.

According to yet another aspect, a longitudinal pitch of the perforations of the first sheet is different than the longitudinal pitch of the perforations of the second sheet, thus when slided against each other, the aligned region is changing longitudinal position in a manner of a propagating wave. The positional relation between the first and second perforated sheets may be changed intermittently or continuously during scavenging to any positional relation between the above first positional relation and the above second positional relation.

According to another aspect of the present invention, the air filter may further comprise a pulse jet back-flow flush system, a precleaner and a three way valve, enabling scavenge of the precleaner and the permeable filter alternately.

The invention also seeks protection for a method of operation of the above described air filter. Accordingly there is provided a method for a scavenging sequence of an air filter for heavy dust conditions comprising one or more of the steps of:

a) providing an air filter comprising: a housing; a permeable filter; and a scavenger system. The scavenger system further comprising: an air suction source; and a shutter. The shutter being selectively operated to permit or restrict passage there-through;
g) setting the shutter to restrict passage there-through;
h) operating the air filter until a determinable amount of particulate material is collected on the upstream surface of the permeable filter;
i) setting the shutter to permit passage there-through;
j) letting the particulate material pass through the shutter;
l) setting the shutter to restrict passage there-through;
n) enabling the air suction source to dispose of the particulate material now located between the shutter and a wall of the housing; and
o) repeating steps g to n as needed.

According to other aspects of the invention, the actual implementation of the invention may further include an optional pulse jet back-flow flush system and a precleaner and a three way valve. Such options if included will add method steps to the above list.

BRIEF DESCRIPTION OF THE DRAWINGS

The invention and the way it may be carried out in practice, will be understood with reference to the following illustrative figures, by way of non-limiting example only, in which like reference numerals identify like elements, and in which:

FIGS. 9a to 9c are schematic top view of a section of the shutter, demonstrating the operation of a shutter made according to another embodiment of the invention.

DETAILED DESCRIPTION OF EMBODIMENTS

According to the present invention there is provided an air filter for heavy dust conditions such as military and off-road vehicles operative in harsh environments. The air filter includes a controllable scavenging shutter that improves scavenging efficiency. A sequence of operation thereof is also provided.

Several terms relating to the present invention will be defined prior to describing the invention in detail. It should be noted that the following definitions are used throughout this application.

For the purposes of the present invention, directional terms such as "top", "bottom", "below", "left", "right", "horizontal", "vertical", "upper", "lower" "down", etc. are merely used for convenience in describing the various implementations of the present invention. The assemblies demonstrating the present invention may be oriented in various ways. For example, the assemblies shown in FIGS. 1 through 7 may be flipped over, inclined or rotated by 90° in any direction.

For the purposes of the present invention, the term "wall" refers to an outer wall as well as an internal partition, or in the wider sense to a layer of structural material defining the physical limit of a space.

For the purposes of the present invention, the term scavenger or scavenging refers to the system or the operation respectively, that performs removal of dirt or refuse from an area, space or region by physical means.

For the purposes of the present invention, the term shutter refers to a mechanical device that is able to restrict or block the passage of air and particulate material therethrough.

For the purposes of the present invention, the term pitch refers to the distance between successive corresponding physical occurrences, such as apertures or perforations in a perforated sheet.

Figure 1:
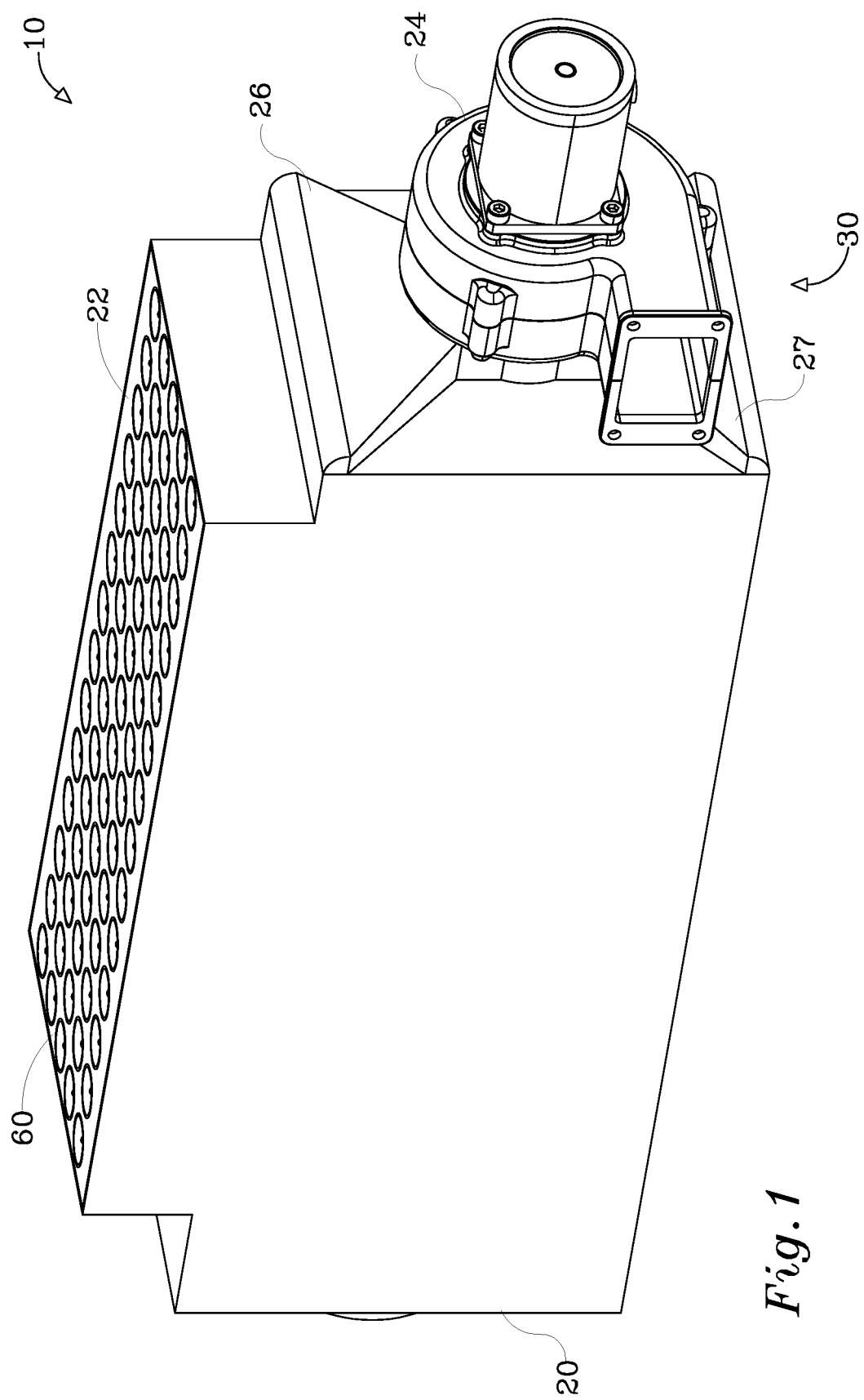
FIG. 1 is a perspective view of an air filter made according to an embodiment of the present invention, shown fully assembled.
Figure 2:
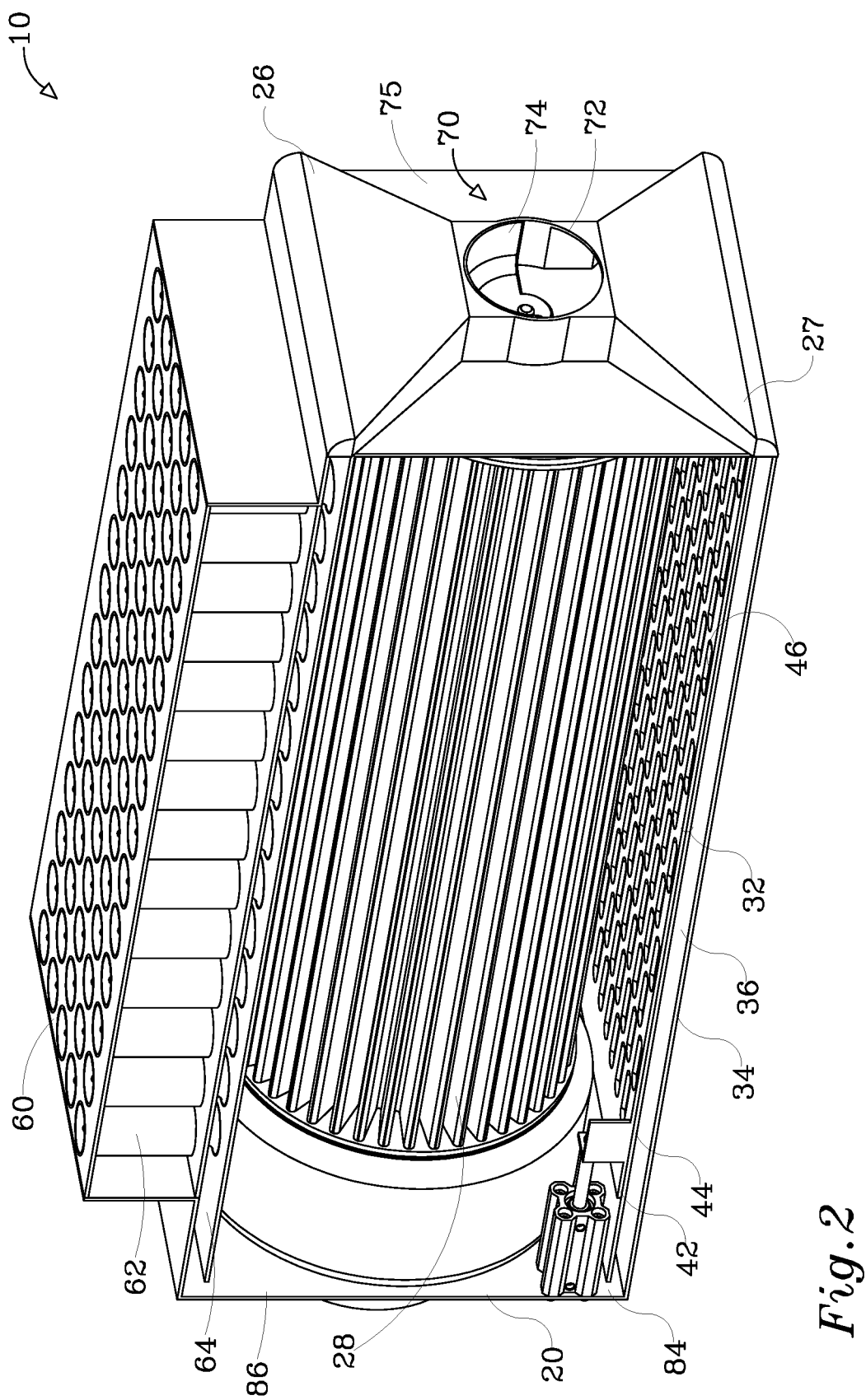
FIG. 2 is a perspective view of the air filter of FIG. 1, shown with one side wall removed exposing the permeable filter and the shutter, the scavenger blower is also removed, exposing a three way valve.

With reference to the figures, according to an embodiment of the present invention, there is shown in FIG. 1, a fully assembled air filter generally referenced 10, and in FIG. 2, the same assembly with some parts removed for clarity. As shown in FIGS. 1 and 2, the air filter comprises: an external housing 20, an inlet grill 22 located on top of a precleaner 60, at least one permeable filter 28, shown cylindrical by way of example only, and a scavenger system generally referenced 30 (FIG. 1). The scavenger system 30 disposes of particles collected at the precleaner 60 collecting gap 64, and on the upstream or outer surface of the permeable filter 28 as will be herein after explained.

A minimal scavenger system 30 according to the present invention, is configured to dispose of particles collected upstream at least the permeable filter. Such minimal scavenger system comprises an air suction source, for instance, blower 24 and a shutter 32. The shutter 32 is positioned substantially along and typically below the permeable filter 28, at a certain distance from a wall, typically a bottom wall 34, and optionally a partition of the housing 20.

The air suction source or blower 24 draws air from a collecting space 36 formed between the shutter 32 and the bottom wall 34 of housing 20. According to the invention, the shutter 32 is being selectively operated to permit or restrict passage there-through. The air suction source or blower 24 efficiently operates to scavenge particles from the above mentioned collecting space 36, when the passage through the shutter 32 is blocked or at least partially restricted, as will be herein-below further explained.

Figure 5:
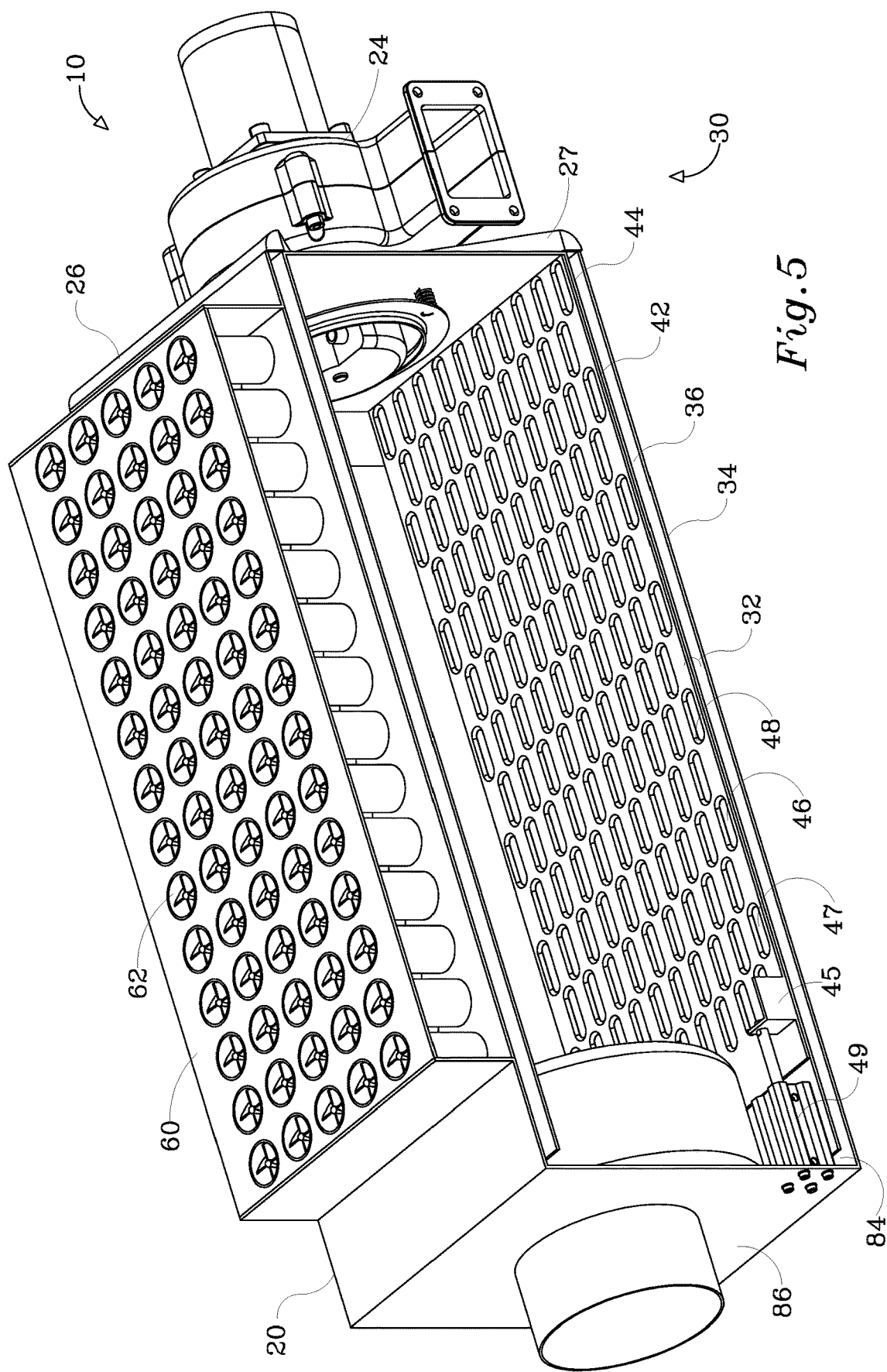
FIG. 5 is yet a different perspective view of the air filter as shown in FIG. 1, with one side wall and the permeable filter removed.
Figure 6:
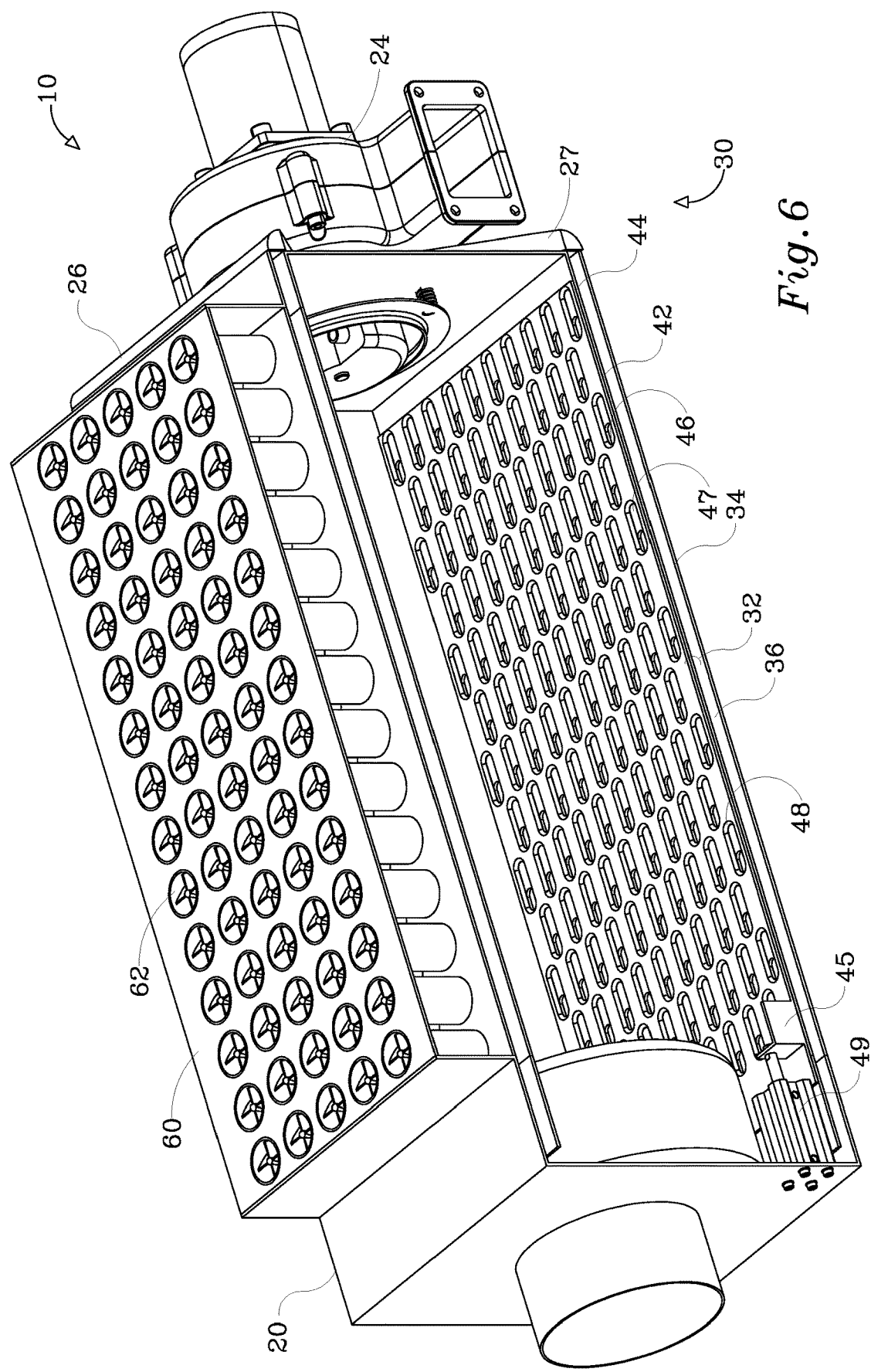
FIG. 6 is a perspective view of the air filter of FIG. 5, demonstrating operation of the shutter.
Figure 7:
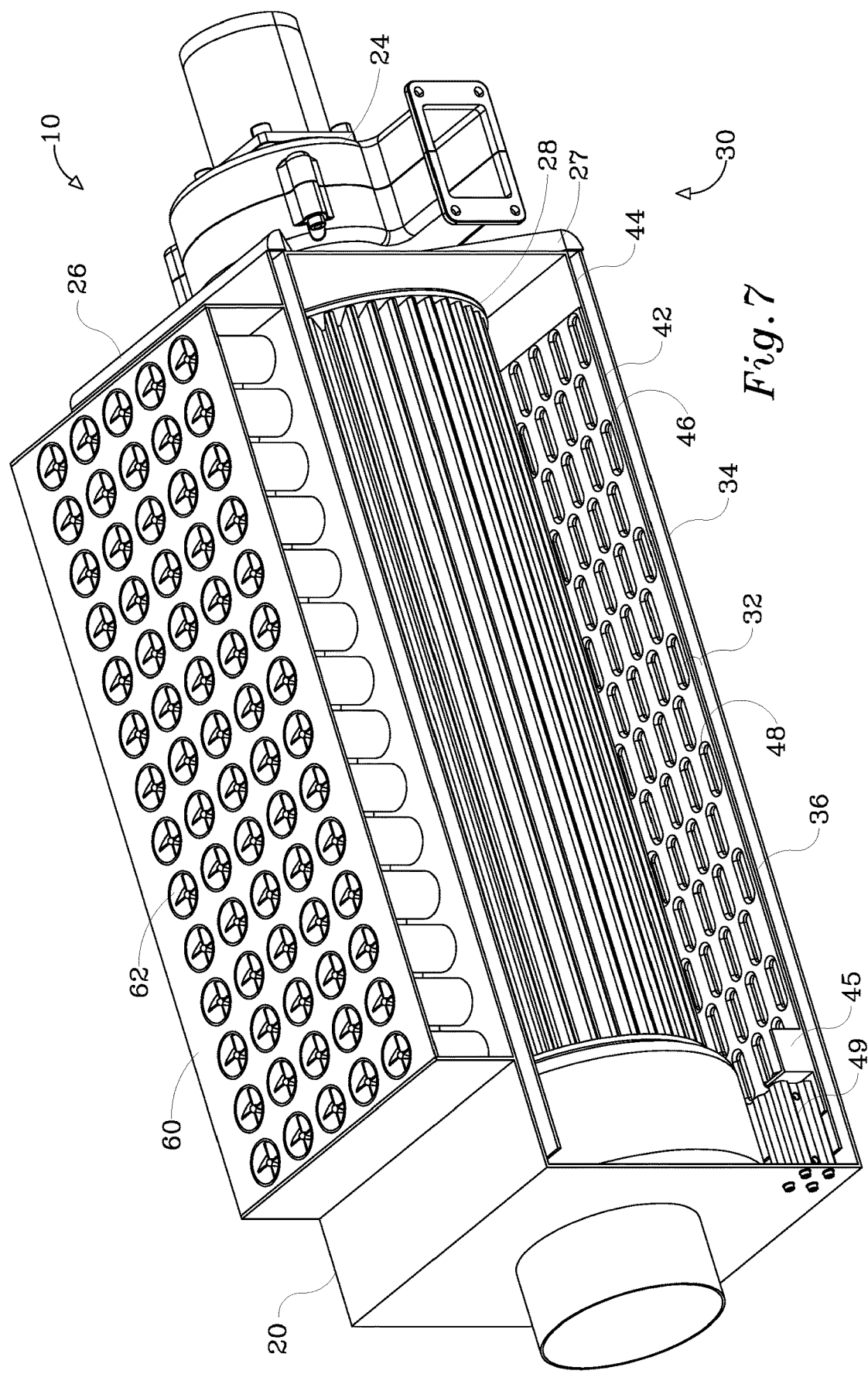
FIG. 7 is a perspective view of the air filter of FIG. 6, demonstrating operation of the shutter with the permeable filter in position.

Yet with reference to FIG. 2, in conjunction with FIGS. 5 to 7, the shutter 32 comprises a first perforated sheet 42 and a second perforated sheet 44 slide-ably seated against each other. The perforations 46 of both perforated sheets are so arranged that at a first positional relation between the first 42 and the second 44 perforated sheets as shown in FIG. 5, the perforations 46 of the first sheet 42 are substantially positioned against an unperforated area 47 of the second sheet 44, thus blocking or at least partially restricting passage through the shutter 32. At a second positional relation between the first 42 and second 44 perforated sheets, as shown in FIG. 7, all or at least a region of the perforations 46 of the first sheet 42 are aligned with all or at least a region of the perforations 46 of the second sheet 44, thus permitting controllable passage of air and collected particles through the shutter 32.

FIG. 6 depicts an intermediate positional relation between the first 42 and the second 44 perforated sheets, where the perforations 46 of the first 42 upper sheet are substantially half way aligned with the perforations 46 of the second 44 lower sheet.

Preferably but not necessarily, the perforations 46 of the first 42 and second 44 perforated sheet are elongated oval perforations. The first 42 upper perforated sheet may include chamfers 48 on the circumference of each of the perforations 46 to permit easier drop of the collected particles into the perforations and down to the collecting space 36 formed between the shutter 32 and the bottom wall 34 of housing 20, when the shutter 32 is set to permit passage there-through as shown in FIG. 7.

Figure 8A:
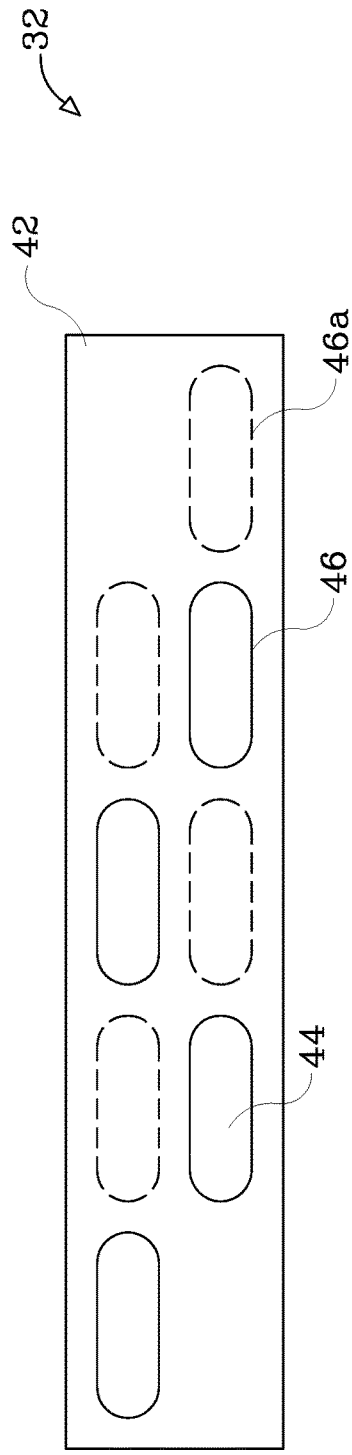
FIGS. 8a to 8c are schematic top view of a section of the shutter, demonstrating the operation of a shutter made according to one embodiment of the invention.
Figure 8B:
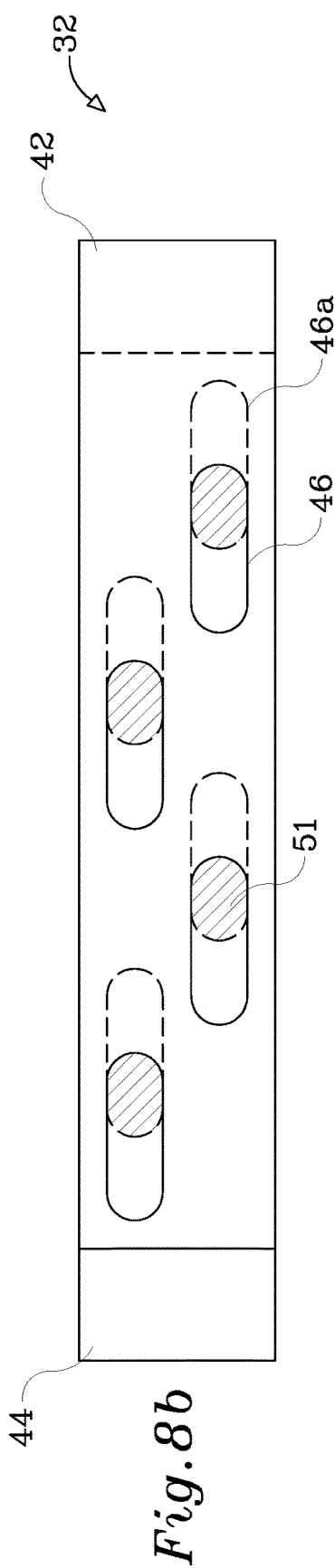
Figure 8C:
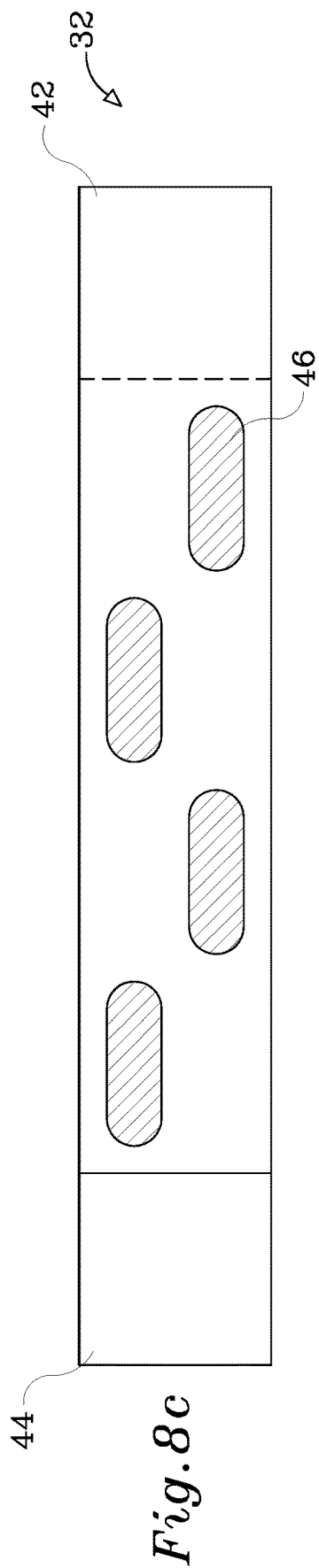

With reference now to FIGS. 8a to 8c, each of the figures demonstrates a schematic top view of a rectangular section of the shutter generally referenced 32, depicting with more clarity the principal of operation of the shutter as described above with reference to FIGS. 5, 6 and 7. FIG. 8a demonstrates a section of the shutter 32 at a fully blocked position as shown also in FIG. 5. The visible perforations 46 of the first upper sheet 42, expose an unperforated area of the second bottom sheet 44. The perforations 46a of the second bottom sheet which are not visible are drawn with a hidden line.

FIG. 8b demonstrates the same section of the shutter 32, with the first upper sheet 42 slided to the right on top of the stationary second bottom sheet 44, partially exposing the perforations 46a of the second bottom sheet 44, as shown also in FIG. 6. The area 51 which enable passage through the shutter 32 is diagonally hatched to highlight the partially restricted opening through the shutter.

FIG. 8c demonstrates the same section of the shutter 32, with the first upper sheet 42 slided further to the right on top of the stationary second bottom sheet 44, fully exposing the perforations 46a (same as 46 in FIG. 8c) of the second bottom sheet 44, as shown also in FIG. 7. The shutter 32 as depicted in FIG. 8c permits full passage therethrough, since the perforations 46 of the first upper sheet 42 fully coincident with the perforations 46a of the second bottom sheet 44. The area of the passage is diagonally hatched to highlight the maximal opening through the shutter. It will be understood that the perforations are shown oval by way of example only, any other shape such as for example round, square, rectangular, hexagonal or octagonal may be used to the same extent.

With reference to FIGS. 2 and 5, it should be noted that the shutter 32 is shorter than the housing 20, leaving a suction gap 84 of free airflow at a first end thereof, distal from the air suction source or blower 24. The suction gap 84 allows airflow between the rear edge of the shutter 32 and the rear wall 86 of the housing 20. Such airflow is required when scavenging sequence of the permeable filter is in operation and the shutter is fully blocked, as shown in FIGS. 5 and 8a. Air from the internal space of the housing 20 is drawn by the blower 24 through the suction gap 84 and at a relatively high speed all the way trough collecting space 36, collecting particulate material towards the bottom duct 27 and back to the atmosphere through blower 24.

With reference to FIGS. 9a to 9c, a different implementation of a shutter made according to the present invention is demonstrated. Each of the figures depicts a schematic top view of a rectangular section of the shutter, generally referenced 32, shown at different positional relation between the first upper sheet 42 and the second lower sheet 44. The perforations 46 are round perforations by way of example only.

According to the above implementation, a longitudinal pitch of the perforations of the first upper sheet 42 is different than the longitudinal pitch of the perforations of the second lower sheet 44, thus when the perforated sheets are slided against each other, a region of aligned perforations is changing longitudinal position along the shutter in a manner of a propagating wave.

In more detail, FIG. 9a depicts a first relational position between the perforated sheets where the most left perforations 46 of the first upper sheet 42 coincident with the perforations 46a of the second lower sheet 44, thus mostly the left portion of the shutter section 32 permits flow there-through. FIG. 9b depicts a second relational position between the perforated sheets where the first upper sheet 42 is slided to the right on top of the stationary second lower sheet 44, the most left perforations 46 of the first upper sheet 42 only partially coincident with the perforations 46a of the second lower sheet 44, restricting the passage. However at the same time the most right perforations 46 of the first upper sheet 42 also partially coincident with the perforations 46a of the second lower sheet 44, thus the flow is divided into two regions. FIG. 9c depicts a third relational position between the perforated sheets where the first upper sheet 42 is slided further to the right, resulting that the most right perforations 46 of the first upper sheet 42 coincident with the perforations 46a of the second lower sheet 44, thus mostly the right portion of the shutter section 32 permits flow there-through.

The above concept of shutter sheets having different perforation pitch permits efficient scavenging of the collecting space 36 formed between the shutter 32 and the bottom wall 34 of housing 20, by regions. The positional relation between the upper first sheet 42 and the lower second sheet 44 may be changed intermittently or continuously during scavenging to any positional relation between a first positional relation where the passage through the shutter 32 is restricted or blocked and a second positional relation where the passage is permitted. Accordingly, the upper first sheet 42 may change position during the scavenging cycle thus changing the position of the region accepting active scavenging. As a result, a propagating wave of air suction is generated, pulling the particulate material towards the lower duct 27 and through blower 24 back to the atmosphere. It will be understood that many variants of the above concept may be applied such as different shapes and pitches of perforations, different speed of relative movement of the perforated sheets, and even gradually changing pitch along the shutter length.

The positional relation or sliding movement of the first perforated sheet 42 on top of the second perforated sheet 44 is performed by way of example only, by means of at least one pneumatic cylinder 49. The pneumatic cylinder 49 is attached to the housing 20 at one end and attached to the first upper perforated sheet 42 at the other end by means of a bracket 45. It will be understood that any mechanical means such as: screw and nut, rack and pinion, lever mechanism, crank mechanism, eccentric mechanism and any other actuation mechanism may be used to the same extent and all fall under the scope of the present invention. Additionally it will be understood that the first upper perforated sheet 42 may be fixed in position and the second lower perforated sheet 44 may be moved. Optionally both perforated sheets 42, 44 may be moved in relation to each other and to the housing 20.

Figure 3:
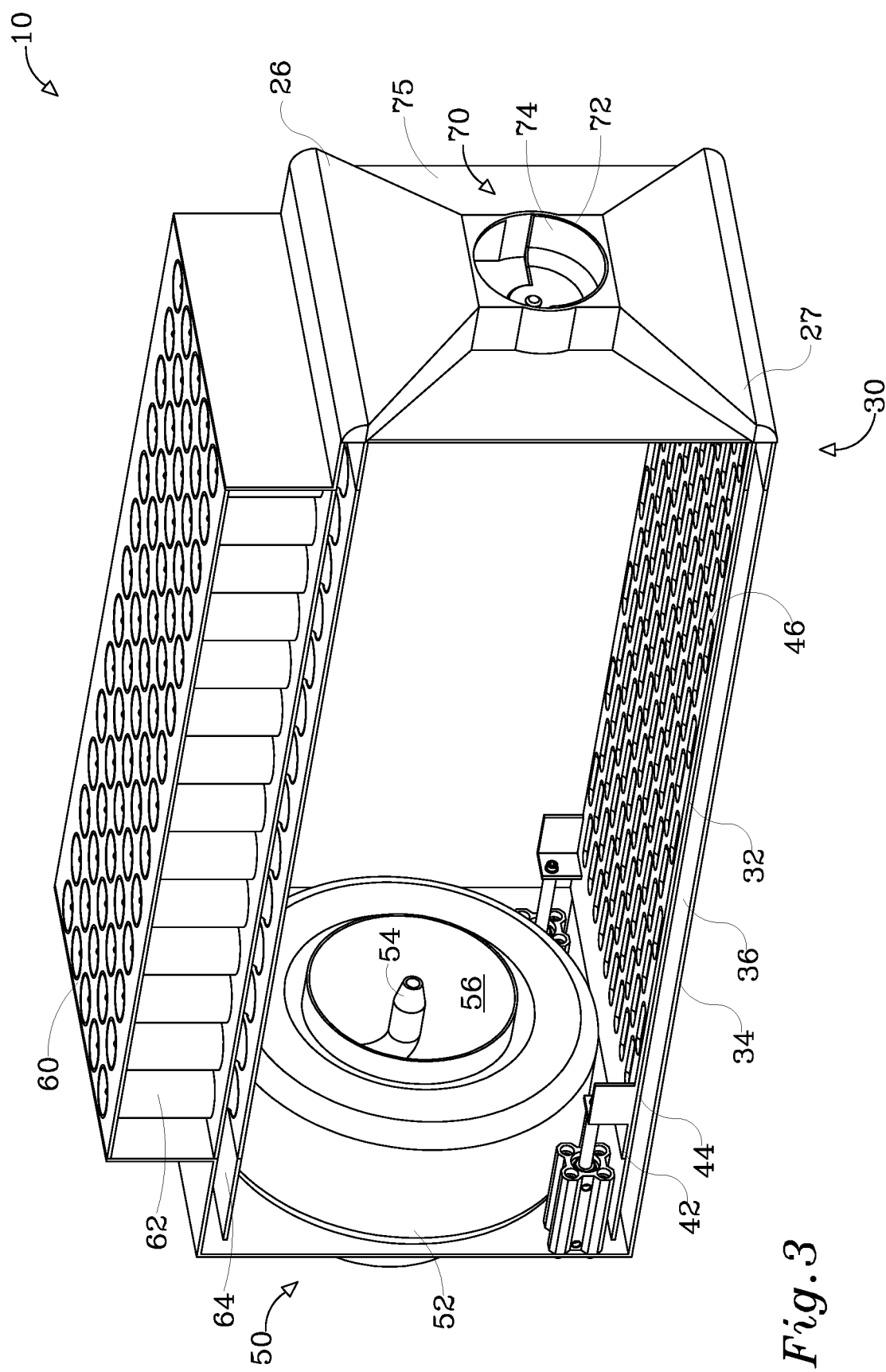
FIG. 3 is a perspective view of the air filter of FIG. 2, shown without the permeable filter and depicting a second position of the three way valve.

With reference to FIG. 3, the air filter 10 is shown with the permeable filter 28 removed to expose an optional pulse jet back-flow flush system generally referenced 50. The pulse jet back-flow flush system comprises an air tank 52 tubular in shape and a nozzle 54 located substantially at the center of the outlet pipe 56. A fast acting valve (not shown) located in the air tank 52 releases pulses of compressed air through the nozzle 54 to create a back-flow jet of air that releases particles from the upstream surface of the permeable filter 28 as known in the art.

Further shown in FIGS. 2 and 3 is an optional precleaner 60, typically a multi vortex tube type precleaner. Air drawn through each of the vortex tubes 62, circulates about a vertical central axis such that the heavy particles are pushed against the wall of the vortex tube and falls down to the precleaner collecting gap 64. The scavenging blower pulls a stream of air that evacuates the particles from the precleaner collecting gap 64 through an upper duct 26 and back to the atmosphere. The scavenging blower may be operated constantly or intermittently.

Yet with reference to FIGS. 2 and 3, the scavenger system may further comprise a three way valve generally referenced 70, enabling scavenge of the precleaner 60 and the permeable filter 28 alternately. The three way valve shown in the figures, by a way of example only, is a pneumatically actuated rotational valve. As shown in the figures, the three way valve 70 has a round opening 72 where the scavenging blower 24 (not shown in FIGS. 2 and 3) suction port is connected. Inside the three way valve 70 there is a rotatable hemicylindrical vane 74, shown at the upper position in FIG. 2, and at the lower position in FIG. 3. Accordingly, when the hemicylindrical vane 74 is rotated to the upper position (FIG. 2) there is an open airflow path from the permeable filter collecting space 36, through a bottom duct 27 and opening 72 to the scavenging blower 24. In contrast, when the hemicylindrical vane 74 is rotated to the lower position (FIG. 3) there is an open airflow path from the precleaner collecting gap 64 through the upper duct 26 and opening 72 to the scavenging blower 24.

Figure 4:
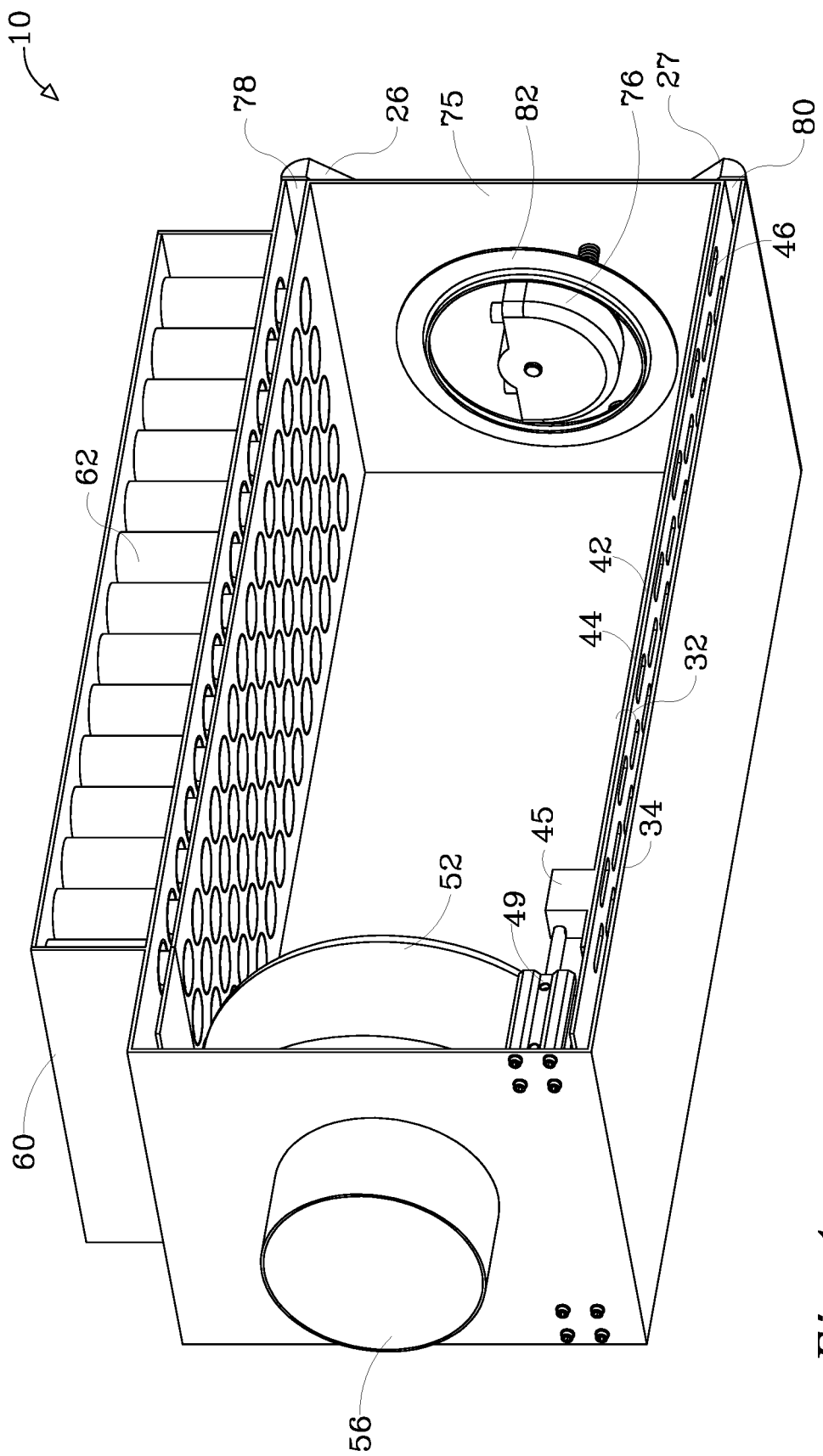
FIG. 4 is a different perspective view of the air filter as shown in FIG. 3.

With reference to FIG. 4, the hemicylindrical vane 74 is rotated by an actuator 76 located in the housing 20. The actuator 76 shaft is extending into the three way valve 70 central space through an opening in the housing 20 front wall 75. When the actuator 76 is seated in position, the hemicylindrical vane 74 is fitted to the shaft of the actuator 76. The actuator 76 may be a pneumatic actuator, however electric motorized or mechanical actuators are also possible. It will be understood that the three way valve may be implemented in many different ways for example using two phase shifted swivel louver blades located at the upper duct 26 and lower duct 27, thus one is blocking the flow path while the other permits flow. The use of two independent valves associated by a system control is also possible. Yet with reference to FIG. 4, there are shown the upper duct 26 inlet 78 scavenging the precleaner 60 and the lower duct 27 inlet 80 scavenging the permeable filter 28. A spring loaded ring 82 affixes the permeable filter 28 in position and presses the other end of the permeable filter 28 against the air tank 52. It will be understood however that other means for affixing the permeable filter 28 in position may be used such as screws, eccentric lock, latch, wedge or a collapsible clamping ring.

It should be noted that although the invention is described with reference to a cylindrical permeable filter, it is equally effective for other types of permeable filters such as a single or multiple V pack arrangement as known in the art. In case of a V pack arrangement, the pattern of perforations of the shutter may accept a dedicated shape following the footprint of the V pack permeable filter.

As indicated in the background, the air filter 10 is intended for use in military and heavy off-road vehicles where large mass of particulate material should be removed from the ambient air before it is permitted into the inlet manifold of the main engine. It is known in the art of such filters that the vortex type precleaner may remove up to 99% of the contaminants from the air stream, accordingly it is desired that the three way valve 70 is set to scavenge the precleaner 60 most of the time. However, during operation the permeable filter 28 gradually collects particulate material on the upstream surface to a point where there is a significant air flow restriction and pressure drop over the permeable filter 28. At this point a control system of the air filter activates the pulse jet system 50, if applied, to produce a series of back-flow jet pulses. According to the present invention, substantially at the same time that the pulse jet system 50 is operative, the shutter 32 is set to permit passage there-through such that the particulate material knocked off the permeable filter 28 falls by gravity through perforations 46 into the permeable filter 28 collecting space 36. The operation of permitting and restricting or blocking passage through the shutter 32 may be repeated several times in order to vibrate the particulate material collected on top of the shutter 32 and cause it to drop down trough the perforations 46. Following the above steps, the shutter is set to block or restrict passage there-trough and the three way valve is rotated to enable a short scavenging period of the permeable filter 28 collecting space 36. Since the shutter 32 is set to block or restrict passage there-through during scavenging, the entire suction power of the scavenging blower is directed to evacuate the relatively small volume of the permeable filter 28 collecting space 36, thus enabling an efficient scavenging in a short time. When scavenging of the permeable filter 28 collecting space 36 is completed, the three way valve 70 is rotated back to normal continuous scavenging of the precleaner 60. It will be understood that the sequence of operation may accept variations and the exact periods of time dedicated to each of the process steps may be varied according to environmental conditions and the accumulated operation time of the permeable filter 28.

The shutter 32 is described above and in the figures, lying horizontally under the permeable filter 28. It will be understood however that an inclination at a certain angle or even vertical position of the shutter is also possible. Additionally, the shatter 32 may accept a non-planar shape such as a V shape or an arc cross section. The perforated sheets 42, 44 may have a certain amount of flexibility such that longitudinal curvature of the shutter 32 is also possible. All such positional and structural variations fall under the scope of the present invention.

The present invention seeks protection regarding the air filter as described above, as well as the method steps taken to accomplish the desired result of scavenging at least the permeable filter and preferably both the permeable filter and the precleaner.

Accordingly a method is provided comprising one or more of the steps below:

a) providing an air filter comprising: a housing; a permeable filter; and a scavenger system. The scavenger system further comprising: an air suction source; and a shutter. The shutter being selectively operated to permit or restrict passage there-through;
b) optionally providing a pulse jet back-flow flush system;
c) optionally providing a precleaner;
d) optionally providing the scavenger system with a three way valve;
e) setting the three way valve to scavenge the precleaner;
f) enabling the air suction source to dispose of particles collected by the precleaner;
g) setting the shutter to restrict passage there-through;
h) operating the air filter until a determinable amount of particulate material is collected on the upstream surface of the permeable filter;
i) setting the shutter to permit passage there-through;
j) letting the particulate material pass through the shutter;
k) operating the pulse jet back-flow flush system;
l) setting the shutter to restrict passage there-through;
m) setting the three way valve to scavenge the permeable filter;
n) enabling the air suction source to dispose of the particulate material now located between the shutter and a wall of the housing; and
o) repeating steps g to n as needed.

It will be understood that steps b and k depend on the optional implementation of the pulse jet back-flow flush system and are not mandatory for operation of the basic implementation of the present invention. At the same way, steps c to f and m depend on the optional implementation of a precleaner and a three way valve, and are not mandatory for operation of the basic implementation of the present invention.

It will be appreciated that the specific embodiments of the present invention described above and illustrated in the accompanying drawings are set forth merely for purposes of example. Other variations, modifications, and applications of the present invention will readily occur to those skilled in the art. It is therefore clarified that all such variations are considered within the scope and spirit of the invention. Accordingly, the protection sought herein is as set forth in the claims below.

The invention claimed is:

1. An air filter for heavy dust conditions comprising: a housing; a permeable filter; and a scavenger system, said scavenger system disposes of particles collected on an upstream surface of said permeable filter, said scavenger system further comprising: an air suction source; and a shutter, said shutter is positioned substantially along said permeable filter, at a certain distance from a wall of said housing, said air suction source draws air from a collecting space formed between said shutter and said wall, wherein said shutter being selectively operated to permit or restrict passage there-through, and wherein said air suction source efficiently operates to scavenge particles from said collecting space, when the passage through said shutter is at least partially restricted.

2. An air filter as claimed in claim 1, wherein said shutter is positioned substantially below said permeable filter.

3. An air filter as claimed in claim 1, wherein said wall is an internal partition of said housing.

4. An air filter as claimed in claim 1, wherein said wall is a bottom wall of said housing.

5. An air filter as claimed in claim 1, wherein said shutter comprising a first perforated sheet and a second perforated sheet slide-ably seated against each other, the perforations of said perforated sheets are so arranged that at a first positional relation between said first and second perforated sheets said perforations of said first sheet are substantially positioned against an unperforated area of said second sheet, thus at least partially restricting passage through said shutter, while at a second positional relation between said first and second perforated sheets, at least a region of the perforations of said first sheet are aligned with at least a region of the perforations of said second sheet, thus permitting controllable passage through said shutter.

6. An air filter as claimed in claim 5, wherein a longitudinal pitch of said perforations of said first sheet is different than a longitudinal pitch of said perforations of said second sheet, thus when slided against each other, said aligned region is changing longitudinal position in a manner of a propagating wave.

7. An air filter as claimed in claim 6, wherein said positional relation between said first and second perforated sheets may be changed intermittently or continuously during scavenging to any positional relation between said first positional relation and said second positional relation.

8. An air filter as claimed in claim 5, wherein said shutter is shorter than said housing, leaving a suction gap of free airflow at a first end thereof, distal from said air suction source.

9. An air filter as claimed in claim 5, wherein said perforations of said first and second perforated sheets are elongated oval perforations.

10. An air filter as claimed in claim 5, wherein said first perforated sheet slides on top of said second perforated sheet by means of at least one pneumatic cylinder.

11. An air filter as claimed in claim 1, wherein said air suction source is an electric blower.

12. An air filter as claimed in claim 1, further comprising: a precleaner.

13. An air filter as claimed in claim 12, wherein said scavenger system further comprises a three way valve, enabling scavenge of said precleaner and said permeable filter alternately.

14. An air filter as claimed in claim 12, wherein said precleaner is a multi vortex tube type precleaner.

15. An air filter as claimed in claim 1, further comprising a pulse jet back-flow flush system.

16. A method for a scavenging sequence of an air filter for heavy dust conditions comprising the steps of:

a) providing an air filter comprising: a housing; a permeable filter; and a scavenger system, said scavenger system further comprising: an air suction source; and a shutter, said shutter being selectively operated to permit or restrict passage there-through;

g) setting said shutter to restrict passage there-through;

h) operating said air filter until a determinable amount of particulate material is collected on an upstream surface of said permeable filter;

i) setting said shutter to permit passage there-through;

j) letting said particulate material pass through said shutter;

l) setting said shutter to restrict passage there-through;

n) enabling said air suction source to dispose of said particulate material now located between said shutter and a wall of said housing; and o) repeating steps g to n as needed.

17. A method as claimed in claim 16, further comprising between steps a and g the step of:

b) providing a pulse jet back-flow flush system; and between steps j and l the step of:

k) operating said pulse jet back-flow flush system.

18. A method as claimed in claim 17, further comprising between steps b and g the steps of:

c) providing a precleaner;

d) providing said scavenger system with a three way valve;

e) setting said three way valve to scavenge said precleaner;

f) enabling said air suction source to dispose of particles collected by said precleaner; and further comprising between steps l and n the step of:

m) setting said three way valve to scavenge said permeable filter.

\* \* \* \* \*